(12) United States Patent
Wilden (10) Patent No.: US 10,293,384 B2
(45) Date of Patent: May 21, 2019

(54) CENTRIFUGAL CLEANING INSTALLATION AND METHOD FOR OPERATING A CENTRIFUGAL CLEANING INSTALLATION

(71) Applicant: TMS TURNKEY MANUFACTURING SOLUTIONS GMBH, Linz (AT)

(72) Inventor: Stefan Wilden, Titz (DE)

(73) Assignee: TMS TURNKEY MANUFACTURING SOLUTIONS GMBH, Linz (AT)

( * ) Notice: Subject to any disclaimer, the term of this patent is extended or adjusted under 35 U.S.C. 154(b) by 0 days.

(21) Appl. No.: 15/116,983

(22) PCT Filed: Jan. 26, 2015

(86) PCT No.: PCT/EP2015/051465
§ 371 (c)(1),
(2) Date: Aug. 5, 2016

(87) PCT Pub. No.: WO2015/117853
PCT Pub. Date: Aug. 13, 2015

(65) Prior Publication Data
US 2017/0173644 A1    Jun. 22, 2017

(30) Foreign Application Priority Data
Feb. 6, 2014   (AT) .............. A 50094/2014

(51) Int. Cl.
*B08B 7/00*        (2006.01)
*B23Q 11/00*       (2006.01)
(Continued)

(52) U.S. Cl.
CPC .............. *B08B 7/00* (2013.01); *B08B 7/02* (2013.01); *B08B 13/00* (2013.01); *B23Q 11/0075* (2013.01); *F26B 5/08* (2013.01)

(58) Field of Classification Search
CPC .. B08B 7/00; B08B 7/02; B08B 11/00; B08B 5/04; B08B 5/00; B08B 13/00;
(Continued)

(56) References Cited

U.S. PATENT DOCUMENTS 4,090,309 A * 5/1978 Rollins ................ F26B 5/08
                                                   134/153
5,339,539 A   8/1994 Shiraish
(Continued)

FOREIGN PATENT DOCUMENTS

CH         647709       2/1985
DE        19633771      2/1998
(Continued)

OTHER PUBLICATIONS

PCT Search report issued in PCT/EP2015/051465.
Search Report issued in Austrian Application No. A50094/2014 dated Nov. 11, 2014.

*Primary Examiner* — Spencer E Bell
*Assistant Examiner* — Tinsae B Ayalew
(74) *Attorney, Agent, or Firm* — Greenblum & Bernstein, P.L.C.

(57) ABSTRACT

In order to adapt a centrifugal cleaning installation (1) in a simple manner to different components (7), the centrifugal cleaning installation (1) is provided with a clamping unit (14) for clamping and retaining a component holder (4a, 4b, 5a-5d) for the component (7). The clamping unit (14) and a drive (6) are removably connected to the component holder (4a, 4b, 5a-5d) and said component holder (4a, 4b, 5a-5d) is adapted to a specific component (7) by positioning devices (25) and/or balance weights (26) provided on the holder.

11 Claims, 6 Drawing Sheets

(51) Int. Cl.
*F26B 5/08* (2006.01)
*B08B 7/02* (2006.01)
*B08B 13/00* (2006.01)

(58) Field of Classification Search
CPC ......... B23Q 11/0075; B23Q 7/00; F26B 5/08;
F26B 5/00; F26B 17/00; F26B 17/24;
F26B 19/00; B04B 3/00; H01L 21/00;
H01L 21/304
USPC ........................................................ 134/157
See application file for complete search history.

(56) References Cited

U.S. PATENT DOCUMENTS

| | | | |
|---|---|---|---|
| 6,665,951 B1 | 12/2003 | Kuhl | |
| 2006/0201536 A1 | 9/2006 | Solcz | |
| 2013/0192646 A1 | 8/2013 | Wittendorfer | |
| 2016/0008854 A1 | 1/2016 | Wittendorfer | |

FOREIGN PATENT DOCUMENTS

| | | |
|---|---|---|
| DE | 19853260 | 6/1999 |
| DE | 202013100959 | 3/2013 |
| EP | 1223397 | 7/2002 |
| JP | 2004057909 | 2/2004 |
| WO | WO 2012/048921 | 4/2012 |

\* cited by examiner

CENTRIFUGAL CLEANING INSTALLATION AND METHOD FOR OPERATING A CENTRIFUGAL CLEANING INSTALLATION

The present invention relates to a centrifugal cleaning installation comprising a component holder which can be connected to an industrially manufactured component to be centrifuged, and a drive to co-operate with the component holder for rotation of the component holder. Furthermore, the present invention relates to a method for operating a centrifugal cleaning installation for centrifuging an industrially manufactured component, wherein a component is conveyed into the centrifugal cleaning installation, the component is held by a component holder, the component holder is rotated by a drive in order to centrifuge the held component, and after the centrifuging the component holder is released from the component and the centrifuged component is removed from the centrifugal cleaning installation.

Industrially manufactured components, such as for example engine blocks, cylinder heads, cylinder blocks, crankshafts, etc., usually run through a series of successive processing steps until completion. After or before specific processing steps, cleaning steps are frequently also provided or necessary, in order to clean the component of liquids, such as for example oil or cooling lubricants used in machine tools, and/or chips. In this case a cleaning step can also comprise a plurality of different cleaning processes. For industrially manufactured components washing installations are standard, in which the component is washed using a washing medium, often also using different media, often also using different washing processes. Such washing installations are known for example from DE 20 2013 100959 U1 or WO 2012/048921 A1.

So-called centrifugal cleaning installations are also known, in which the component is received in a holder and is centrifuged in order to remove liquid and/or chips adhering thereto by the acting centrifugal forces. This allows a sorted recovery of a liquid, such as for example oil or cooling lubricant, adhering to the component. Such centrifugal cleaning installations are used not only before or after processing steps, but also are frequently employed in order to pre-clean the component in a cleaning step before a washing installation, in order to prevent excessive ingress of contaminants into the washing installation, which could entail an undesirable frequent changing of washing medium in the washing installation. In this case a centrifugal cleaning installation can also be used for drying of the component after a washing installation. A cleaning step with a centrifugal cleaning installation is disclosed for example by US 2006/0201536 A1.

A centrifugal cleaning installation is known for example from EP 1 223 397 B1. In this case industrially manufactured components are conveyed by means of a conveyor installation into a holding frame, in which the component is fixed by means of clamps. The holding frame is then rotated by a drive fixedly connected thereto, so that the component is cleaned or dried. In principle the holding frame is only suitable for a specific component, since the holding frame must have clamping elements adapted to the component and the holding frame with component must also be appropriately balanced, in order to be able to be rotated subsequently. Such a centrifugal cleaning installation is therefore very inflexible, in particular a change of component can only be achieved with difficulty. For a change of component the clamping elements on the holding frame must be replaced. Furthermore, suitable balance weights must be arranged at the correct locations on the holding frame. This is usually carried out manually. A possible but very costly alternative would be to provide an arrangement for automatic balancing on the holding frame.

It is an object of the present invention to provide a flexibly usable centrifugal cleaning installation, which in particular can be adapted in a simple manner to different components.

This object is achieved according to the invention in that in the centrifugal cleaning installation a clamping unit for clamping and retaining the component holder is provided and the clamping unit and the drive are releasably connected to the component holder, wherein the component holder is adapted to a specific component by positioning devices and/or balance weights are provided on the component holder. The object is also achieved by a method for operating the centrifugal cleaning installation, wherein a component holder is releasably connected to a clamping unit, and before the centrifuging of the next component the component holder connected to the clamping unit is released from the clamping unit and is replaced by another component holder associated with the next component. The problem of costly adaptation to different components is solved in a simple manner, as a component holder is associated with a specific component and all measures necessary for this component, in particular positioning devices and/or balance weights matched thereto, are already provided on the component holder. Thus the centrifugal cleaning installation can be converted for a new component very simply and quickly, and also by an automated process, without costly handling.

In this connection it is advantageous if a plurality of component holders intended in each case for a specific component are arranged in a component holder magazine in holders provided therefor and each component holder is adapted to a specific component by positioning means and/or balance weights. Thus the required component holder can be simply removed from the component holder magazine or the component holder which is no longer required can be set down in the component holder magazine.

It is particularly advantageous if the component holder magazine is arranged in the centrifugal cleaning installation in such a way that a receptacle of the component holder magazine is arranged aligned with the clamping unit. This makes possible a particularly simple clamping of a component holder by means of the clamping unit, which only has to be moved towards the component holder, preferably in a simple linear movement. This is achieved in design terms for example by the configuring the component holder magazine as a turntable, on which a plurality of receptacles for component holders are arranged distributed over the circumference, and that a magazine drive is provided for rotating the turntable. For this purpose the component holder magazine is advantageously arranged on the support structure, which also produces a particularly compact structure of the centrifugal cleaning installation.

In order to ensure good retention of a component holder in the receptacle of the magazine and a correct position of the component holder in the magazine, a sleeve can be arranged advantageously on a component holder, and an axial guidance groove which co-operates with a guide element on the receptacle can be provided on the sleeve.

High cycle times and a simple working process, in particular a simpler change of component, can be achieved by arrangement of the clamping unit on a movable carriage and the clamping unit can be moved back and forth by movement of the carriage between a centrifuging position and a clamping position remote therefrom.

In this case, if the clamping unit in the clamping position is in engagement with a component holder located in the component holder magazine, the component holder in the clamping position can be very simply set down in the receptacle of the component holder magazine or can be withdrawn therefrom. This is further simplified if the component holder in the clamping position is engaged in a receptacle of the component holder magazine, so that the component holder in the clamping position is already securely retained in the component holder magazine.

The grasping of a component by a component holder is simplified if the clamping unit is arranged on a movable carriage and the clamping unit with a component holder held thereby comes into engagement with the component in the centrifugal cleaning installation by movement of the carriage into a centrifuging position. Thus a high cycle time and a simple working process, in particular a simple change of component, can also be achieved, without having to be moved into a clamping position.

A change of component holder is simplified if the clamping unit is arranged on a movable carriage and the clamping unit with the retained component holder is movable into a changeover position remote from the component.

A particularly advantageous configuration is produced if the clamping position is arranged between the changeover position and the centrifuging position. Thus both a change of component and also a change of component holder can be carried out with only one movement, preferably a linear movement of a carriage.

If the drive is arranged on the movable carriage, the drive for indirect driving of the component holder can co-operate with the clamping unit, which simplifies the structure.

The present invention is explained in greater detail below with reference to FIGS. 1 to 9, which show by way of example, schematically and without limitation, advantageous embodiments of the invention. In the drawings.

The centrifugal cleaning installation 1 according to the invention is explained in greater detail below with reference to FIG. 1 on the basis of a specific advantageous exemplary embodiment in a particularly compact design. The centrifugal cleaning installation 1 here consists of a stationary support structure 2 on which opposing component holder magazines 3a, 3b with component holders 4a, 4b, 5a-5d held therein and a drive 6 for a component holder 4 are arranged. Furthermore, the centrifugal cleaning installation 1 comprises opposing clamping means 14 by which component holders 4a, 4b, 5a-5d can be grasped, clamped and retained. In the illustrated exemplary embodiment a component 7 should be held between a set of two opposing component holders 4c, 5c, as described in greater detail below. Therefore in FIG. 1 two component holder magazines 3a, 3b are arranged axially spaced apart. Of course, however, a component 7 can also be held in the centrifugal cleaning installation 1 only on one side by a component holder 4a, 4b. In this case a second component holder magazine 3b could also be omitted. The drive 6 is releasably connected to a component holder 4a, 4b, 5a-5d, as is explained in greater detail below.

Here a component holder magazine 3a, 3b comprises a rotatably supported turntable 8a, 8b with a plurality of receptacles 13 for component holders 4a, 4b, 5a-5d distributed over the circumference of the turntable 8a, 8b, as is explained in greater detail below with reference to FIGS. 2 and 3. The turntables 8a, 8b, which can be connected to one another by a connecting shaft 10 for this purpose, are rotated by means of a magazine drive 9 which is connected to the rotatably supported turntable 8b. Alternatively both turntables 8a, 8b could be driven by separate magazine drives 9.

Of course, the component holder magazines 3a, 3b may also be configured in any other way and also it does not have to be arranged on the support structure 2 of the centrifugal cleaning installation 1, but may also be arranged for example adjacent to the support structure 2. In principle it would even be conceivable to have absolutely no component holder magazine 3a, 3b in the centrifugal cleaning installation 1, in particular when only very rarely a change of component holder is necessary.

A component 7 can be conveyed into the centrifugal cleaning installation 1 by means of a conveying device 11, in this case a roller track arranged below the component holders 4a, 4b, 5a-5d. In a transfer position P a lifting device 12, for example a simple lifting table, by means of which a component 7 can be lifted by the conveying device 11 and conveyed into a receiving position A in the centrifugal cleaning installation 1, is provided in the region of the conveying device 11. In this case, of course, the conveying device 11 can be arranged in any way, for example also above, transversely to or adjacent to the centrifugal cleaning installation 1, and can also be configured in any way, for example also as an overhead track or also as a robot.

Figure 2:
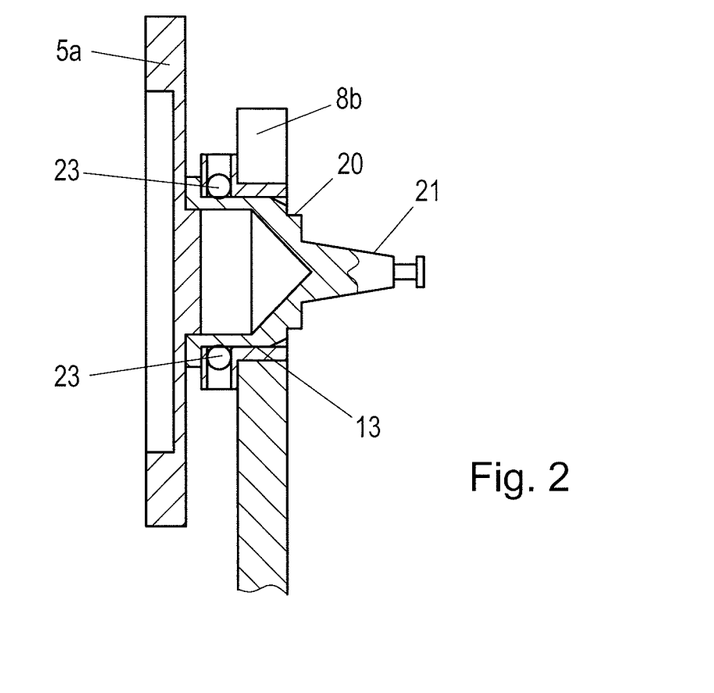
FIG. 2 shows a component holder in a receptacle of a component holder magazine.
Figure 3:
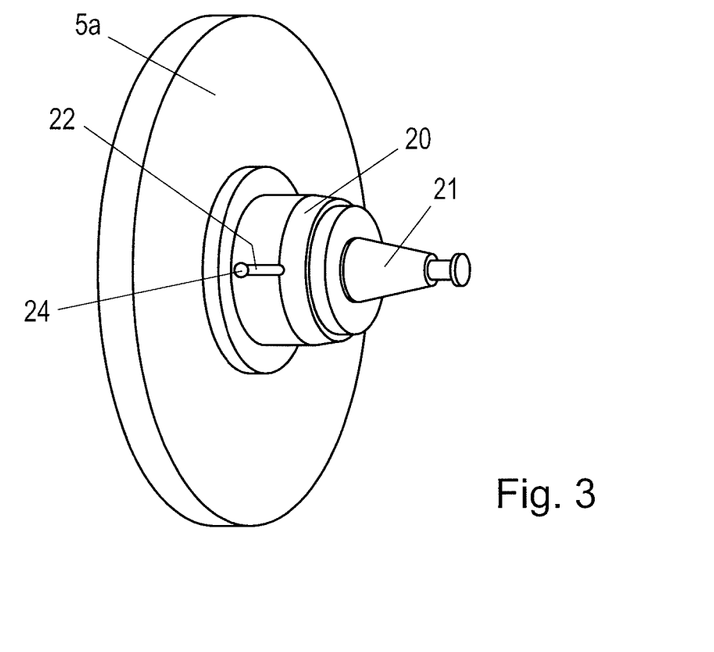
FIG. 3 shows a component holder with a sleeve and a shank taper for clamping the component holder with a clamping unit.

As shown in FIGS. 2 and 3, in the illustrated exemplary embodiment a sleeve 20 with a standardized shank taper 21 (which can also be configured as a hollow shank taper), such as is usual in the case of machine tools as tool holder, is provided on a component holder 4a, 4b, 5a-5d. A component holder 4a, 4b, 5a-5d is arranged in the component holder magazine 3a, 3b in a receptacle 13 provided on the turntable 8a, 8b. Therefore, for example, an axial guidance groove 22, which co-operates with a guide element 23, for example a ball, on the receptacle 13, can be provided on the sleeve 21. An engaging recess 24, in which the guide element 23 engages, can also be provided at the end of the guidance groove 22. In this way a component holder 4a, 4b, 5a-5d is retained securely in the receptacle 13 in the turntable 8a, 8b and simultaneously the guidance groove 22 also ensures a defined angular position of a component holder 4a, 4b, 5a-5d on the turntable 8a, 8b. The shank taper 21 can be grasped and clamped by a well-known (in particular from machine tools) and commercially available clamping unit 14, for example a SK clamping unit.

By means of the clamping unit 14 a component holder 4a, 4b, 5a-5d clamped therein can be rotated. For this purpose the drive 6 is for example connected by means of a belt 18 to the clamping unit 14, as indicated in FIG. 1. Therefore in this connection "clamping" means that the component holder 4a, 4b, 5a-5d is retained in the clamping unit 14 in order to be able to be rotated by means of the clamping unit 14 or by parts of the clamping unit 14. Of course other releasable clamping and drive systems are also possible and conceivable for connecting a component holder 4a, 4b, 5a-5d to the clamping unit 14 or to the drive 6. It would be conceivable, for example, that the component holder 4a, 4b, 5a-5d is driven directly by a drive 6, for example in the form of movable or pivotable gear wheels or friction wheels which co-operate with associated engaging elements on the component holder 4a, 4b, 5a-5d. In this context it is important that the clamping unit 14 and the drive 6 can be separated, individually or jointly, from the component holder 4a, 4b, 5a-5d. In this case the drive 6 can be separated indirectly from the component holder 4a, 4b, 5a-5d if the drive 6 drives a part of the clamping unit 14 (as in FIG. 1). The drive 6 can also be separated directly from the component holder 4a, 4b, 5a-5d if the drive 6 directly drives the component holder 4a, 4b, 5a-5d.

Figure 4:
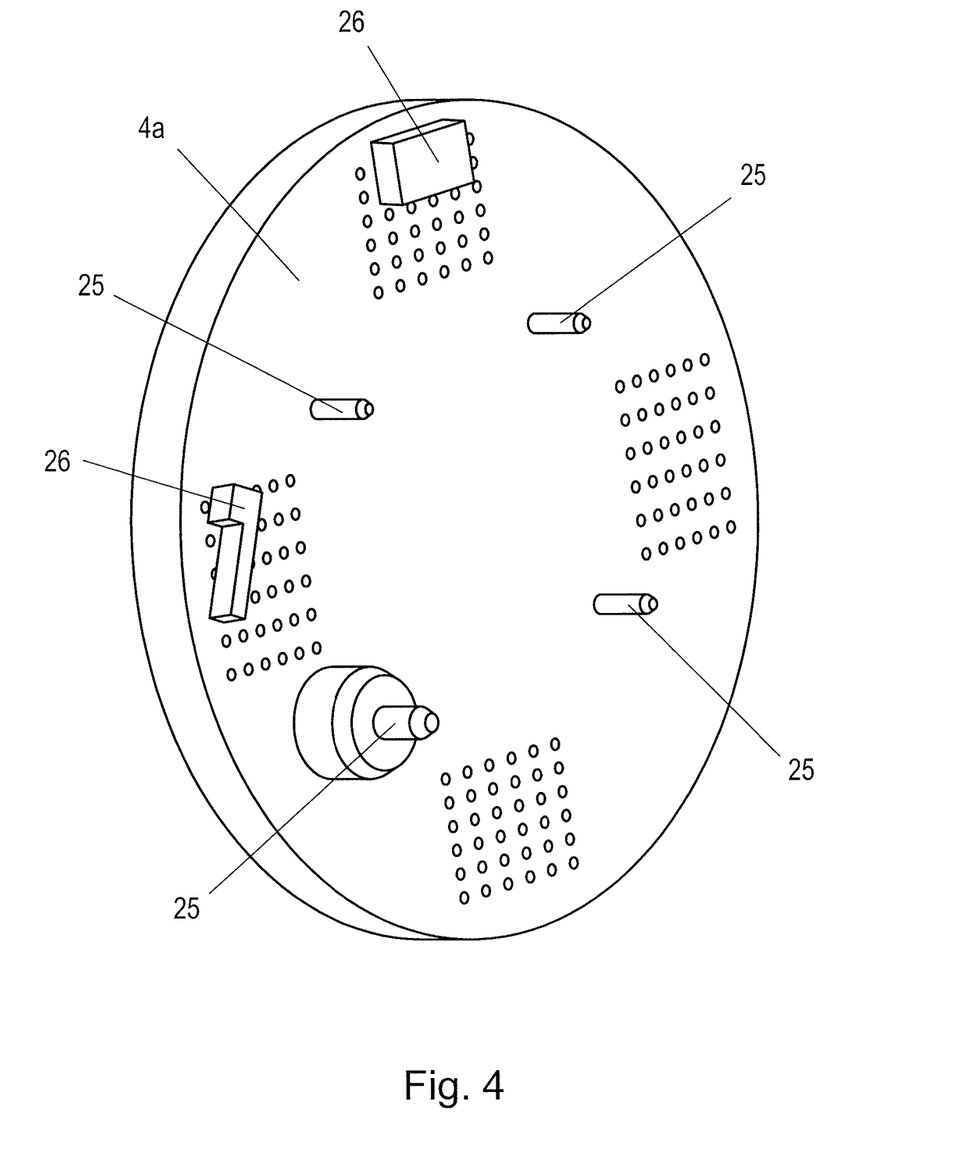
FIG. 4 shows a component holder with adapted positioning devices and balance weights.

Each component holder 4a, 4b, 5a-5d, or respectively each set of related component holders 4a, 5a or 4b, 5b, etc., is prepared for a specific component 7, as illustrated in FIG. 4. For this purpose positioning devices 25 which are required at the component holder 4a, 4b, 5a-5d, for example locating pins or positioning bores, are provided, which when in use co-operate with mirror-inverted positioning devices on the component 7, in order to ensure a defined position of the component 7 on a component holder 4a, 4b, 5a-5d. Furthermore, the component holder 4a, 4b, 5a-5d is also prepared for a specific component 7 by the arrangement of balance weights 26.

Figure 1:
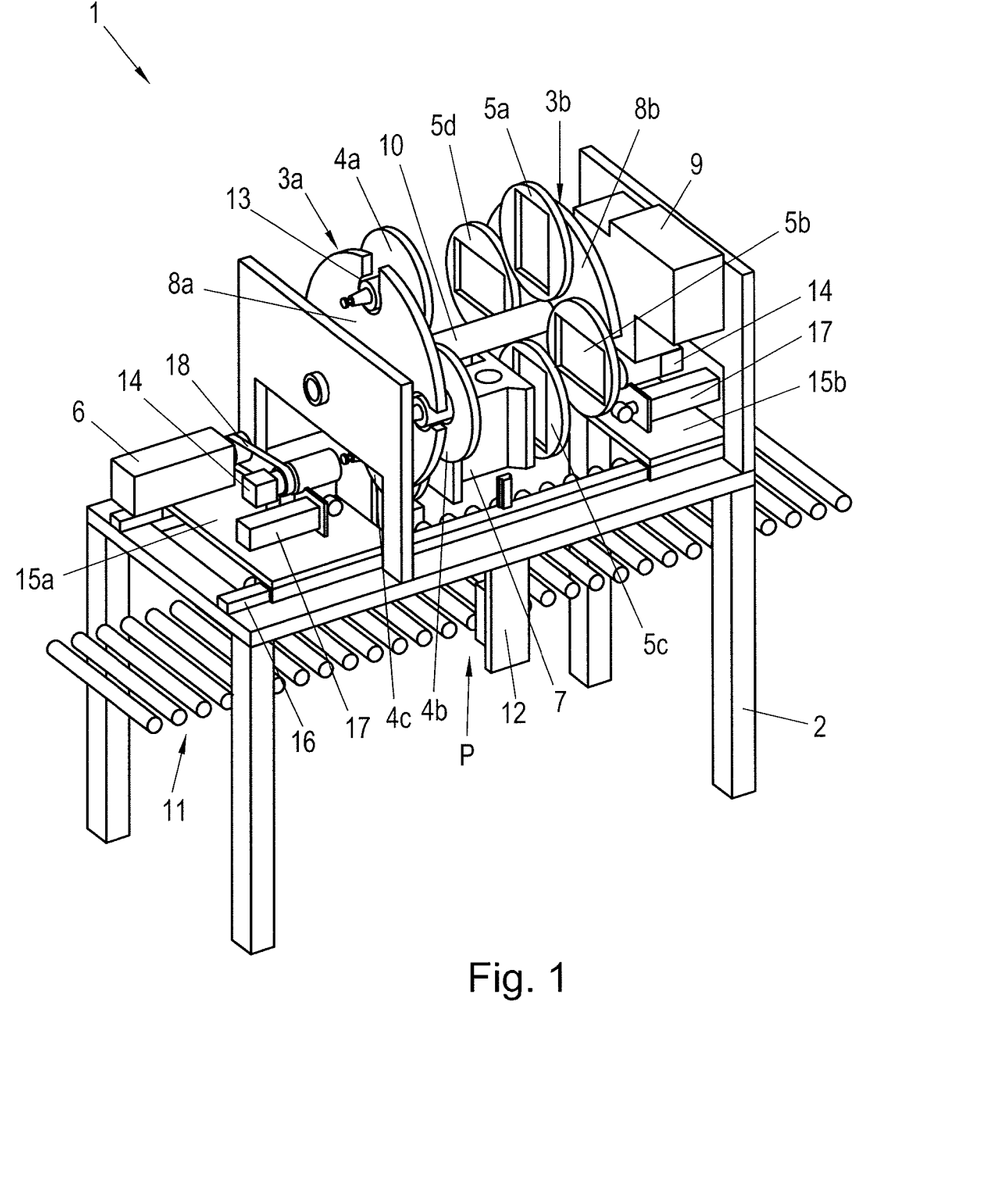
FIG. 1 shows an advantageous embodiment of a centrifugal cleaning installation according to the invention.

A typical sequence in the centrifugal cleaning installation 1 according to FIG. 1 is described with reference to FIGS. 5 to 7. In this case the same reference signs relate to the same parts.

Figure 5:
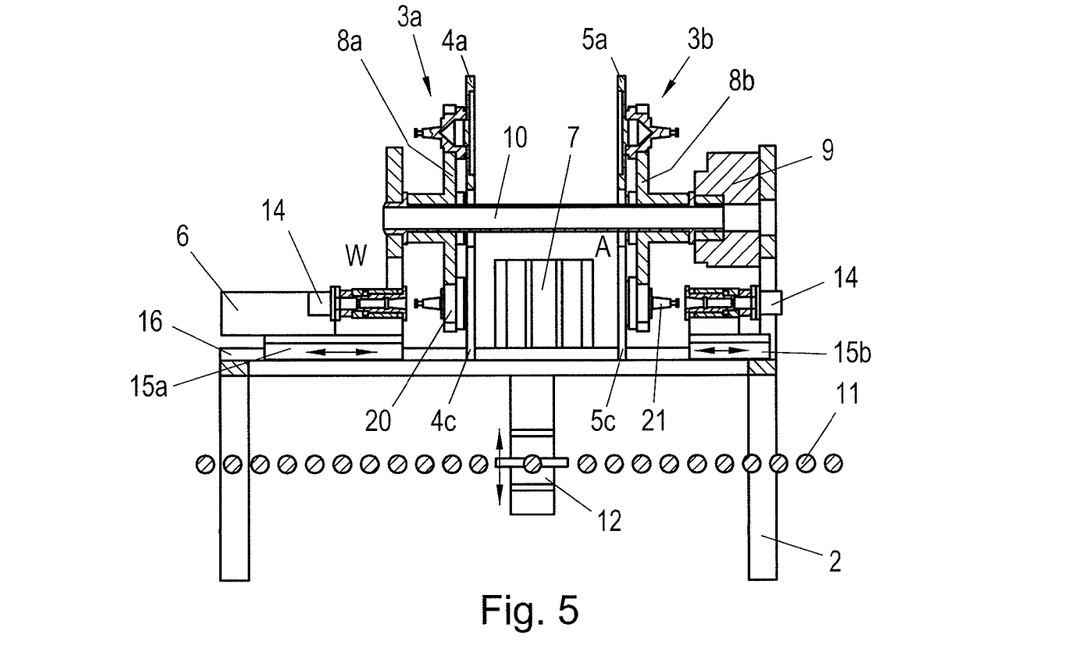
FIGS. 5 to 7 show an advantageous method sequence in the centrifugal cleaning installation.

In FIG. 5 the component 7 has been conveyed by means of the conveying device 11 and the lifting device 12 into the centrifugal cleaning installation 1, so that the component 7 is now located in the receiving position A. Simultaneously the correct component holders 4c, 5c were brought into the correct position in the component holder magazines 3a, 3b. The clamping units 14 at both axially ends of the centrifugal cleaning installation 1 are moved out of a changeover position W away from the component holder magazines 3a, 3b in the direction of the facing sleeves 20 of the component holders 4c, 5c in the receptacles 13 of the turntables 8a, 8b. Receptacles 13 or component holders 4c, 5c arranged therein and clamping units 14 are oriented appropriately relative to one another, preferably with aligned longitudinal axes. Therefore the clamping units 14 are in each case arranged on a movable carriage 15a, 15b. The movable carriages 15a, 15b are guided and mounted on the support structure 2, for example on guide rails 16 on the support structure 2. The drive of the carriages 15a, 15b can be configured in any way, for example in the form of a linear drive 17 which is arranged on the carriage 15a, 15b and which is supported on a fixed point on the support structure 2, as indicated in FIG. 1. The drive 6 for the component holders 4c, 5c is also arranged on a carriage 15a.

Figure 6:
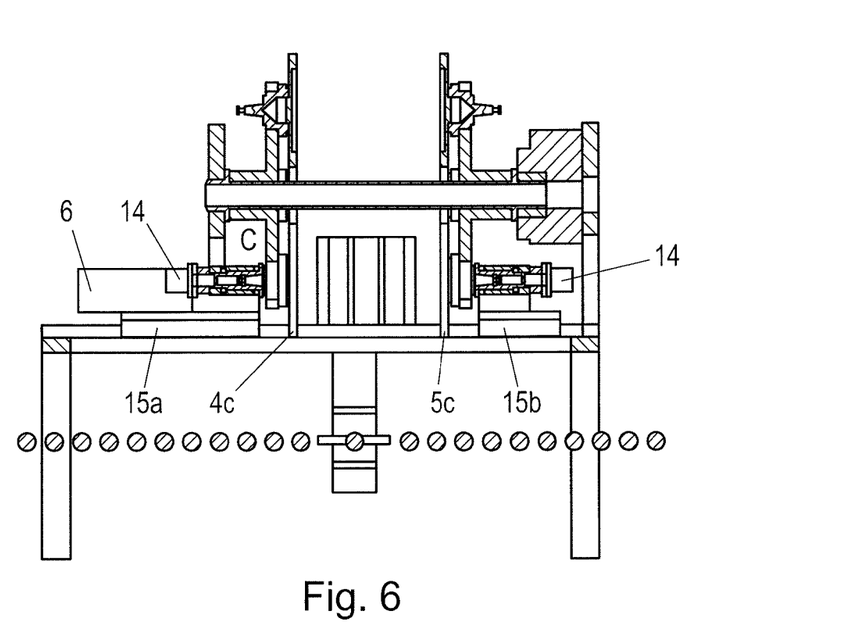
Figure 7:
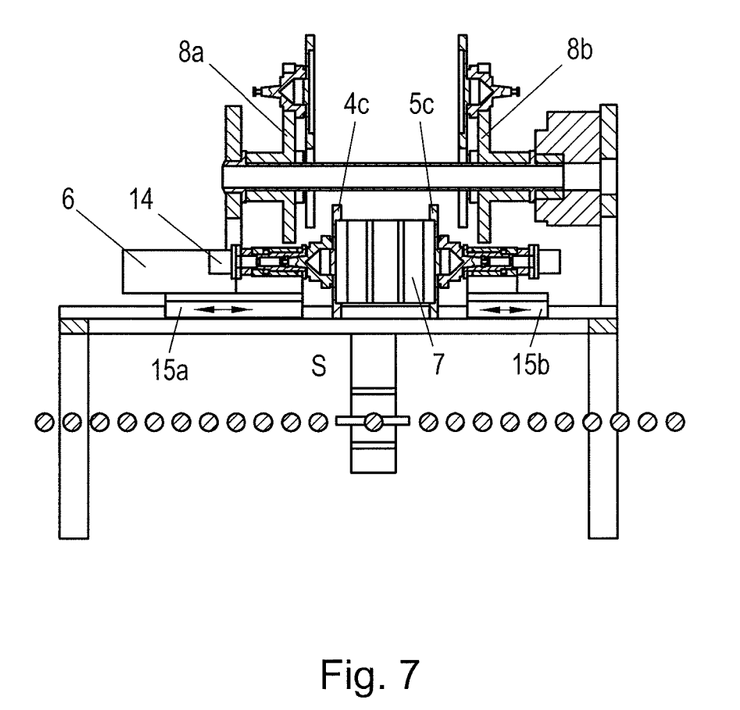

The end of this feeding movement is illustrated in FIG. 6. In this clamping position C the clamping units 14 are now in engagement with the shank tapers 21 of the component holders 4c, 5c and clamp the component holders 4c, 5c. The two carriages 15a, 15b are now moved further relative to one another, so that the component holders 4c, 5c disengage from the receptacles 13 of the turntables 8a, 8b of the component holder magazines 3a, 3b and come into engagement with the component 7 (FIG. 7) by means of the positioning devices 25 in a centrifuging position S. Thus the component 7 is clamped and retained between the component holders 4c, 5c in a defined position. The lifting device 12 can now be moved downwards. Now the component 7 can be rotated by the drive 6, in order to clean and/or dry the component 7 by centrifuging. In this case rotational speeds of greater than 400 min$^{-1}$, typically up to 600 min$^{-1}$, are typically achieved.

Thus centrifuging takes place here about a horizontal axis of rotation. Sufficient balancing (both static and also dynamic) is ensured from the outset by the component holders 4c, 5c adapted to the component 7.

After the centrifuging the component 7 is set down on the lifting device 12, which has been moved upwards again, as the carriages 15a, 15b are moved apart again, so that the component holders 4c, 5c are released from the component 7. The carriages 15a, 15b are preferably moved so far apart that in the clamping position C the component holders 4c, 5c engage again in the free receptacles 13 on the turntables 8a, 8b. Thus a defined angular position of the component holders 4c, 5c is ensured before each centrifuging operation. A new component 7 can now be brought into the centrifugal cleaning installation 1 and the centrifuging process can be repeated on the new component 7.

If a series of similar components 7 are centrifuged one after the other it is in principle not necessary, but possible, to retract the carriages 15a, 15b into the changeover position W (FIG. 5). However, if one component 7 is followed by another component 7, then a change of component holder must be carried out beforehand, as described below.

For this purpose, after conclusion of the centrifuging the carriages 15a, 15b initially moved into the changeover position W (FIG. 5), so that the component holders 4c, 5c are released from the clamping units 14 and thus also from the drive 6. The component holder magazines 3a, 3b can now be rotated with the magazine drive 9, so that the component holders 4a, 5b provided for the expected component 7 come to rest in the receiving position A, that is to say in the correct position, in order to be able to be grasped and clamped by the clamping units 14. Thus the sequence described above can be repeated.

Especially advantageously, the centrifuging position S and the clamping position C and optionally also the changeover position W are aligned with one another, for example along a guide path, in order to be able to approach the individual positions by a simple movement along the guide path, for example by the carriages 15a, 15b along the straight guide 16.

Of course, various alternative embodiments are conceivable. For example, instead of turntables 8a, 8b other forms of magazines could also be provided. It is also conceivable that a change of component holder is carried out manually or by means of a robot. In this connection a component holder magazine 3a, 3b can also be arranged at a different location, for example adjacent to the conveying device 11, or a discrete component holder magazine 3a, 3b in the centrifugal cleaning installation 1 can be completely omitted. Likewise it is conceivable that the component 7 is only grasped and retained on one side, for which a clamping device should then be provided to retain the component 7 on the component holder 4.

In the simplest case, in particular when no component holder magazine 3a, 3b or component holder magazine 3a, 3b is provided away from the support structure 2, the clamping unit 14 does not even have to be movably arranged, whereby the changeover position W, the clamping position C and the centrifuging position S coincide. A change of a component holder 4a, 4b, 5a-5d can then be carried out before a new component 7 is conveyed, for example by means of robots, into the centrifugal cleaning installation 1. Optionally also it is possible for only the movement between the clamping position C and the centrifuging position S to be provided.

During centrifuging, in order to achieve short processing times the component 7 is quickly accelerated to the required speed and after the centrifuging it is decelerated quickly to a standstill. During deceleration the braking energy can be recovered in the form of electrical energy using conventional, available current converter technology, which makes the centrifugal cleaning installation 1 more efficiently in terms of energy.

Safety functions can also be implemented. For example, an unacceptable unbalance may be detected by means of acceleration sensors on the component holders 4a, 4b, 5a-5d, on the clamping unit 14 or the support structure 2, which can lead to switching off of the centrifugal cleaning installation 1.

Figure 8:
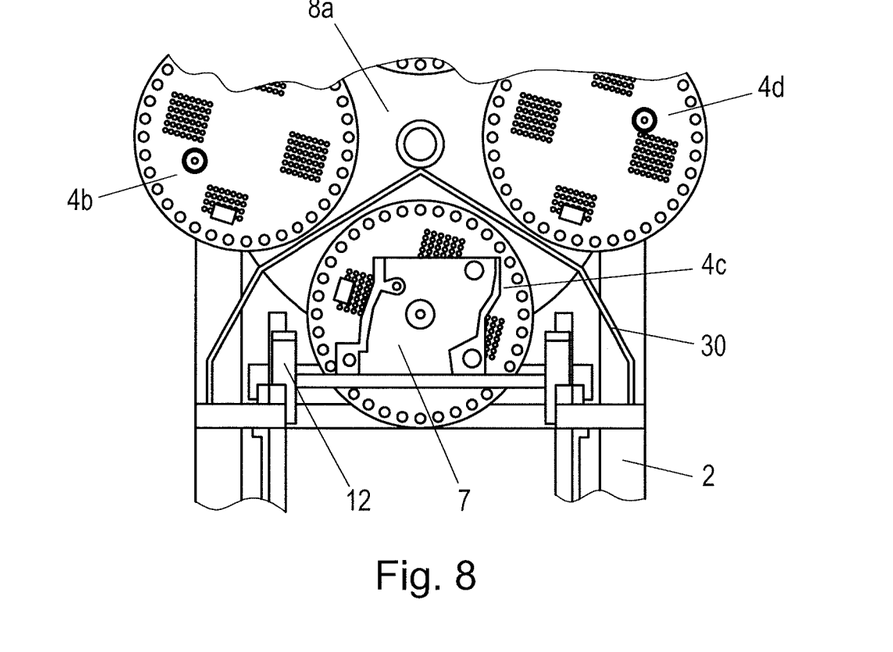
FIG. 8 shows a splash guard and FIG. 9 shows an alternative embodiment of a splash guard.
Figure 9A:
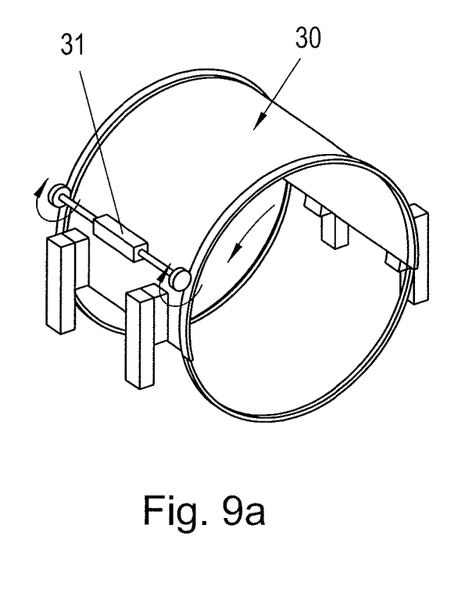
Figure 9B:
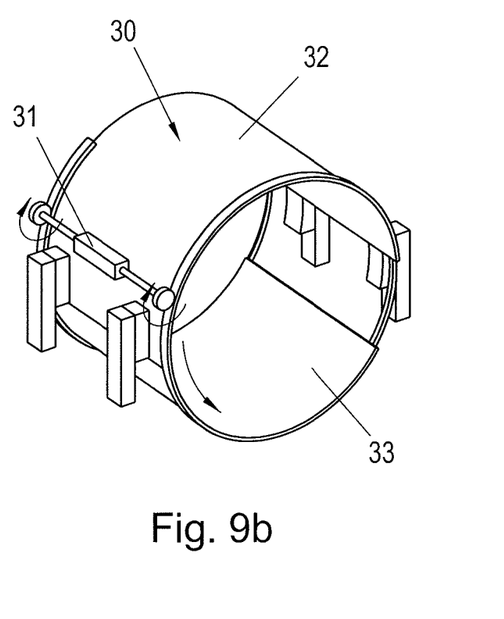

In order to prevent liquid adhering to the component 7 from splashing out into the surroundings during centrifuging, a splash guard 30 can also be provided, which can also be configured as a guard bracket for the component 7, in order to prevent the component 7 from being flung out of the centrifugal cleaning installation 1 in the event of a fault. Such a splash guard 30 is illustrated for example in FIG. 8. FIGS. 9a and 9b show an alternative splash guard 30. Here the upper half of the cylindrical casing surface 32 surrounds the component 7, as in FIG. 8. The lower half of the cylindrical casing surface 33 can be shifted in the circumferential direction by means of a splash guard drive 31. After the component 7 has been introduced into the centrifugal cleaning installation 1 and has been grasped and clamped by the component holders 4c, 5c, and after the lifting device 12 has been lowered, the lower half of the cylindrical casing surface can be rotated below the component 7 in order to achieve a cylindrical enclosure for the component 7.

Below the conveying device 11 a liquid collecting tray (not illustrated) can also be provided, in order to collect and to draw off liquid which is dripping down.

The invention claimed is:

1. A centrifugal cleaning installation for subjecting an industrially manufactured component to centrifugal cleaning, said installation comprising:
   at least one movable clamping unit arranged on a movable carriage;
   said clamping unit being movable along a direction and being configured to assume the following positions:
      a centrifuging position;
      a clamping position that is remote from the centrifuging position; and
      a changeover position that is remote from the clamping position,
   at least one component holder magazine having plural component holder receptacles;
   at least one component holder mounted to at least one component holder receptacle of said plural component holder receptacles and being configured to hold the industrially manufactured component during centrifugal cleaning;
   a drive configured to cause rotation of said component holder about a rotation axis that is parallel to the direction of movement of said clamping unit;
   said clamping unit being releasably connectable to said component holder;
   at least one device mounted to said component holder, said device comprising at least one of:
      one or more positioning devices; and
      one or more balance weights,
   wherein the clamping position is arranged between the changeover position and the centrifuging position, and
   wherein, in the clamping position, said clamping unit is aligned with said component holder receptacle and engages with said component holder while said component holder is mounted to said component holder receptacle of said component holder magazine.

2. The installation of claim 1, wherein, in the centrifuging position, said component holder engages with the industrially manufactured component and is spaced from said component holder magazine.

3. The installation of claim 1, wherein, in the changeover position, said clamping unit is not engaged with said component holder and said component holder is not engaged with the industrially manufactured component.

4. The installation of claim 1, wherein said component holder magazine comprises a rotatably mounted turntable and a drive, and wherein the plural component holder receptacles are circumferentially arranged.

5. The installation of claim 1, wherein said component holder receptacle comprises a guide element configured to cooperate with an axial guidance groove arranged on said component holder.

6. The installation of claim 1, wherein said movable carriage is configured to move from the clamping position to the centrifuging position.

7. The installation of claim 1, wherein said clamping unit engages with said component holder during movement to the changeover position.

8. The installation of claim 1, wherein the drive is arranged on said movable carriage and the direction is a horizontal direction.

9. The installation of claim 1, further comprising a splash guard.

10. A centrifugal cleaning installation for subjecting industrially manufactured components to centrifugal cleaning, said installation comprising:
   at least one movable clamping unit arranged on a movable carriage;
   said clamping unit being configured to assume the following positions:
      a centrifuging position;
      a clamping position that is remote from the centrifuging position; and
      a changeover position that is remote from the clamping position,
   at least one component holder magazine having plural component holder receptacles;
   plural component holders that can each rotate about a horizontal axis and being configured to engage with different industrially manufactured components;
   at least one of said component holders being mounted to at least one of said component holder receptacles of said component holder magazine;
   a drive configured to cause rotation of said component holder;
   said clamping unit being releasably connectable to said component holder;
   at least one device mounted to the at least one component holder, said at least one device comprising at least one of:
      one or more positioning devices; and
      one or more balance weights,
   wherein the clamping position is arranged between the changeover position and the centrifuging position, and
   wherein, in the clamping position, said clamping unit is aligned with said component holder receptacle and engages with said component holder while said component holder is mounted to said component holder receptacle of said component holder magazine.

11. A centrifugal cleaning installation for subjecting an industrially manufactured component to centrifugal cleaning, said installation comprising:
    a first horizontally movable clamping unit arranged on a first movable carriage;
    said first clamping unit being configured to assume the following positions:
        a centrifuging position;
        a clamping position that is remote from the centrifuging position; and
        a changeover position that is remote from the clamping position,
    a first component holder magazine having plural component holder receptacles;
    a first component holder mounted to at least one component holder receptacle of said first component holder magazine and being configured to hold the industrially manufactured component during centrifugal cleaning;
    a first drive configured to cause rotation of said first component holder;
    said first clamping unit being releasably connectable to said first component holder;
    a second horizontally movable clamping unit arranged on a second movable carriage;
    said second clamping unit being configured to assume the following positions:
        a centrifuging position;
        a clamping position that is remote from the centrifuging position; and
        a changeover position that is remote from the clamping position,
    a second component holder magazine having plural component holder receptacles;
    a second component holder mounted to at least one component holder receptacle of said second component holder magazine and being configured to hold the industrially manufactured component during centrifugal cleaning;
    a second drive configured to cause rotation of said second component holder;
    said second clamping unit being releasably connectable to said second component holder,
    wherein the clamping position is arranged between the changeover position and the centrifuging position, and
    wherein, in the clamping position:
    said first clamping unit is aligned with said component holder receptacle and engages with said first component holder while the first component holder is mounted to said first component holder receptacle of the first component holder magazine; and
    said second clamping unit is aligned with said component holder receptacle and engages with said second component holder while the second component holder is mounted to said second component holder receptacle of the second component holder magazine.

* * * * *